June 11, 1963 W. MÖLLER 3,092,994
DEVICE FOR THE ELECTRIC MEASUREMENT OF ROTARY MOMENTS
Filed July 13, 1959
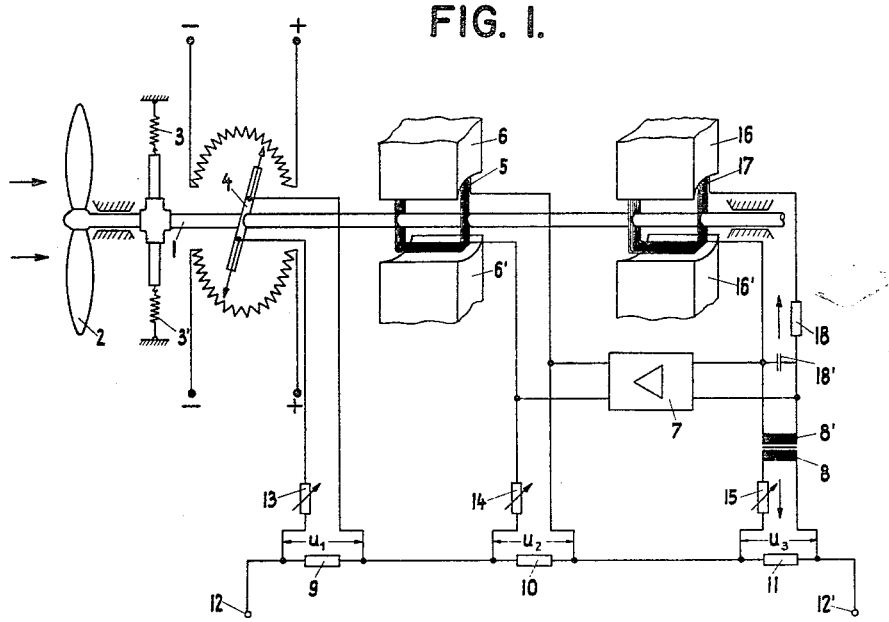
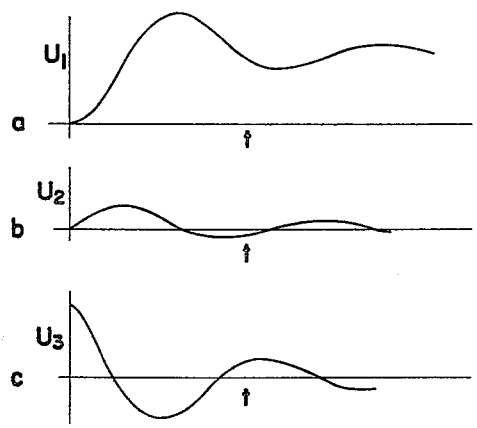
INVENTOR.
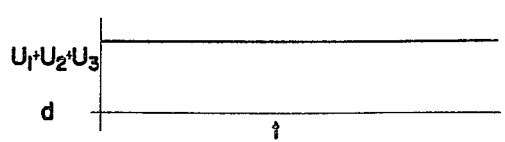

United States Patent Office 3,092,994
Patented June 11, 1963

3,092,994
DEVICE FOR THE ELECTRIC MEASUREMENT OF ROTARY MOMENTS
Waldemar Möller, 10 Weinberstrasse, Überlingen (Bodensee), Germany
Filed July 13, 1959, Ser. No. 826,752
4 Claims. (Cl. 73—134)

This invention is concerned with a device for the electrical measurement of torque, particularly for control and regulation purposes.

Rotary or angular moments considered within the scope of this invention may be the precession torque of a control gyro, torque of flow measuring vanes, weather vanes, or similar systems. One method of measuring torque is to measure the angular deflection assumed by a system against an opposing force, such as a spring. However, such a measurement is retarded and incorrect due to the mass inertia of the system. Consequently, such measured values of rotary moments are unsuitable for certain control and regulation purposes.

It is therefore the object of the present invention to provide a device by means of which the torque acting upon an inert system can be electrically measured before a state of equilibrium can form between the measured torque and an opposing torque. Such an electric measuring value indicates the position which a similar but inertialess system would assume under the influence of the measured torque and a known opposite torque. It will be readily understood that such a torque measuring device would be of great importance for control and regulation purposes or for the investigation of the influences of inertia.

According to the invention, the above object is accomplished by connecting a moving coil with the axis of the system. A voltage proportional to the speed of rotation is induced in the moving coil and fed through an amplifier into a differentiation system to obtain a voltage proportional to acceleration. Moreover, a tap is provided for obtaining a voltage proportional to the angle of rotation. A summation voltage, which is composed of the speed proportional voltage plus the acceleration proportional voltage plus the rotation proportional voltage, serves as the measuring value. If the system is slightly attenuated, it will oscillate before a state of equilibrium is obtained. With a measuring device conceived and constructed in accordance with the invention, a constant measurement is obtained in spite of system oscillations.

According to a further development of the idea of the invention, speed proportional voltage is fed via an amplifier into a torque transmitter arranged on the shaft of the system. It is possible with such an arrangement to measure peaks which are far beyond the normal measuring range of the device. The normal measuring range is determined by the fettering force of the system. For the purpose of measuring small rotary moments, which occur in normal operation, it is advisable to employ a relatively soft fettering in order to obtain a sufficient sensitivity of measurement. However, in the event of disturbance, such as squalls and the like, peaks may occur on the system which are several times greater than the torque which is normally encountered. A lightly fettered system would normally move into the limiting position so that any measuring would be impossible. By the present invention, however, an opposite torque is produced, even under peak conditions, which prevents the system from reaching a limiting position. In this way the device is suitable for measuring small moments of rotation with high sensitivity and is also capable of measuring peaks which greatly surpass the normal measuring range.

The invention will be more fully understood by reference to the following description of a specific embodiment thereof considered with the drawings in which FIG. 1 is a schematic representation of a system illustrated with the present invention, and FIGS. 2a, 2b, 2c, and 2d represent generated voltages as a function of time which are shown to aid in an understanding of the present invention.

The shaft 1 of a system symbolized by flow measuring vane 2, is fettered to a central position by means of two springs 3, 3'. If air impinges upon flow measuring vane 2 in the direction indicated by the arrows, a torque is produced on the flow measuring vane 2 and shaft 1 is rotated against the force of the fettering springs 3, 3'. The system will be caused to oscillate and will slowly attain a state of equilibrium in which the restoring moment of the fettering springs 3, 3' counterbalances the torque of the flow measuring vane 2. The angle by which the flow measuring vane 2 and the shaft 1 are rotated out of their central position is a measure of the torque. This measured value, however, can only be determined and obtained after the balancing process is completed. By the present invention the torque acting on the system may be determined immediately without waiting until a state of equilibrium is reached.

A potentiometer wiper 4 is arranged on the shaft 1 and from it is tapped a voltage $U_1$ having a magnitude proportional to the angle of rotation of the shaft 1. In addition, a coil 5 is provided on the shaft 1 which moves between two magnetic poles 6, 6'. A pulse of D.C. voltage $U_2$ proportional to the angular speed of the shaft 1 is induced in coil 5. Via a suitable amplifier 7 this voltage $U_2$ is impressed across the primary winding 8' of a transformer 8. The secondary voltage $U_3$ of transformer 8 is proportional to the derivative of voltage $U_2$ with respect to time, i.e., it is proportional to the angular acceleration of shaft 1.

The voltages $U_1$, $U_2$ and $U_3$, are impressed across fixed resistances 9, 10 and 11 so that a summation voltage corresponding to torque can be tapped from the terminals 12, 12'. The adjustable resistances 13, 14, 15 permit an adjustment of the components $U_1$, $U_2$, $U_3$ individually and independently of each other and their adaptation to the peculiarities of the system.

A coil 17 seated on the shaft 1 and arranged between the magnetic poles 16, 16' is connected to the output end of the amplifier 7. The amplified voltage $U_2$ thereby generates an attenuating torque that is always in opposition to the torque on the flow measuring vane 2. If rotary moment peaks greater than the maximum counter torque produced by the fettering springs should occur on the flow measuring vane, the counter torque generated electrically by coil 17 will prevent a fracture or breakdown of the springs 3, 3' or a limitation of the movement of the shaft 1 by limit stops.

It is possible, by connecting an adjustable RC-circuit 18, 18' between the amplifier 7 and the coil 17 to control the attenuating counter torque created by coil 17. This may be desirable for certain applications.

To summarize the operation of the present invention, the rotation of shaft 1 is governed by the equation:

$$I\frac{d^2\alpha}{dt^2} = \text{sum of all torques} \qquad (1)$$

where $\alpha$ is the angular deflection of the shaft from its position of rest and $I$ is the moment of inertia of the parts rotatable with the shaft.

The torques are:

(1) the external torque $M_0$, which is to be measured
(2) the torque $M_1$, exerted by the fettering spring, which is proportional to the deflection $\alpha$ from the position of equilibrium $M_1 = -c_1\alpha$ (3) a torque $M_2$ which at any moment is opposed to the respective motion and damps the same. This torque is proportional to the speed of rotation $d\alpha/dt$ $$M_2 = -c_2\frac{d\alpha}{dt} \qquad (2)$$

Thus the equation of motion 1 of the shaft can be written:

$$I\frac{d^2\alpha}{dt^2} = M_0 + M_1 + M_2 = M_0 - c_1\alpha - c_2\frac{d\alpha}{dt} \qquad (3)$$

This can be written:

$$M_0 = c_1\alpha + c_2\frac{d\alpha}{dt} + I\frac{d^2\alpha}{dt^2} \qquad (4)$$

The developed voltages are $$U_1 = c_1{}^*\alpha$$

$$U_2 = c_2{}^*\frac{d\alpha}{dt}$$

$$U_3 = c_3{}^*\frac{d^2\alpha}{dt^2}$$

If the resistors 13, 14, 15 are adjusted in such a manner that $$c_1{}^* = kc_1, \quad c_2{}^* = kc_2, \quad c_3{}^* = kI$$

it can be seen, that $$U_1 + U_2 + U_3 = c_1{}^*\alpha + c_2{}^*\frac{d\alpha}{dt} + c_3{}^*\frac{d^2\alpha}{dt^2}$$

$$= k\left(c_1\alpha + c_2\frac{d\alpha}{dt} + I\frac{d^2\alpha}{dt^2}\right)$$

and consequently in accordance with Equation 4

$$U_1 + U_2 + U_3 = kM_0$$

This equation is the basis of the measuring method of this invention.

During the transient condition to the new position of equilibrium, determined by $$\alpha = \text{const.} = M_0/c_1, \quad M_0 + M_1 = 0, \quad M_2 = 0$$

the voltages $U_2$ and $U_3$ approach zero and $U_1$ alone remains. The current flowing through coil 17 is, in the most simple case if capacitor 18' is omitted, proportional to the voltage $U_2$ and thereby also to the speed of rotation $d\alpha/dt$.

It produces an additional damping torque, which again has the form 2 and which in the case of a large external torque $M_0$ of short duration considerably decreases the deflections $\alpha$. In an extreme case of very strong damping $M_1$ and $Id^2\alpha/dt^2$ can be neglected in Equation 3 and the Equation 3 remains $$M_0 + M_2 = 0 \quad \text{or} \quad M_0 - c_2\frac{d\alpha}{dt} = 0$$

From this you obtain $$\alpha = \frac{1}{c_2}\int_0^t M_0 dt$$

FIGS. 2a, 2b, 2c, and 2d show the voltages $U_1$, $U_2$ and $U_3$ and of the sum $U_1 + U_2 + U_3$ as a function of time.

Although the present invention has been disclosed with respect to a specific embodiment thereof, it is understood that modifications can be made without departing from the scope of the invention as set forth in the appended claims.

I claim:

1. Electrical torque measuring apparatus which comprises force receiving means adapted to rotate about an axis under the influence of a measured force; fettering means adapted to limit the rotation of said force receiving means; means for producing a first electrical potential proportional to the degree of rotation of said force receiving means; inductive second electrical potential generating means driven by said force receiving means to generate a second potential proportional to the angular velocity of said force receiving means; voltage differentiating means adapted to receive said second potential and produce a third potential proportional to the derivative of said second potential with respect to time; and means for measuring said first, second, and third potentials as an indication of the torque exerted on said force receiving means.

2. The apparatus of claim 1 including dynamic braking means on said force receiving means adpted to be energized by said second potential.

3. The apparatus of claim 2 including amplifier means between said second potential and said braking means.

4. Electrical torque measuring apparatus which comprises force receiving means adapted to rotate about an axis under the influence of a measured force; resilient fettering means adapted to limit the rotation of said force receiving means; first voltage producing means for producing a first voltage proportional to the degree of rotation of said force receiving means; first variable impedance means and first fixed impedance means in series relationship across said first voltage producing means; second voltage producing means for producing a second voltage proportional to the angular velocity of said force receiving means; second variable impedance means and second fixed impedance means in series relationship across said second voltage producing means; transformer means for producing a third voltage proportional to the acceleration of said force receiving means; third variable impedance means and third fixed impedance means in series relationship across the secondary of said transformer means; dynamic braking means on said force receiving means in parallel relationship to the primary of said transformer means; amplifier means having its input connected across said second voltage producing means and its output connected across both of said transformer primary and said dynamic braking means; and means for adding the potential drops across said fixed impedance means as an indication of the torque on said force receiving means.

References Cited in the file of this patent

UNITED STATES PATENTS

| | | |
|---|---|---|
| 2,137,530 | Johnson | Nov. 22, 1938 |
| 2,472,609 | Moore | June 7, 1949 |
| 2,838,232 | Gilbert | June 10, 1958 |
| 2,882,721 | Harned et al. | Apr. 21, 1959 |